US006494046B1

(12) United States Patent
Hayess

(10) Patent No.: US 6,494,046 B1
(45) Date of Patent: Dec. 17, 2002

(54) METHOD AND APPARATUS FOR RECOGNITION OF A SHAFT RUPTURE IN A TURBO-ENGINE

(75) Inventor: Burkhard Hayess, Rangsdorf (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 09/622,026

(22) PCT Filed: Nov. 12, 1999

(86) PCT No.: PCT/EP99/08717

§ 371 (c)(1),
(2), (4) Date: Jan. 29, 2001

(87) PCT Pub. No.: WO00/36280

PCT Pub. Date: Jun. 22, 2000

(30) Foreign Application Priority Data

Dec. 14, 1998 (DE) .......................................... 198 57 552

(51) Int. Cl.[7] .................................................. F02C 7/00
(52) U.S. Cl. ....................................... 60/779; 60/39.091
(58) Field of Search ........................... 60/39.03, 39.091, 60/39.281, 779

(56) References Cited

U.S. PATENT DOCUMENTS 3,963,372 A * 6/1976 McLain et al. .......... 60/39.281
4,217,617 A 8/1980 Ross et al.
4,302,813 A 11/1981 Kurihara et al.
4,712,372 A * 12/1987 Dickey et al. ........... 60/39.281
5,804,726 A 9/1998 Geib et al.

FOREIGN PATENT DOCUMENTS

EP 0718608 6/1996

* cited by examiner

*Primary Examiner*—Louis J. Casaregola
(74) *Attorney, Agent, or Firm*—The Law Offices of Timothy J. Klima

(57) ABSTRACT

This invention relates to a method for the detection of a shaft failure in a turbomachine with the object of initiating thereupon an appropriate speed-limiting action, more particularly a rapid fuel shut-off on an aero gas-turbine system, in which a torque-exerting turbine rotor and a torque-recipient unit are connected via the shaft (3) to be monitored for failure, said shaft being supported at its ends in at least two roller bearings (6, 7). In this method, the rotational frequencies ($f_{n1}$, $f_{n2}$) of the two shaft ends of the shaft compared with each other continually and essentially in real time, with a failure of the shaft (3) inferred if the rotational frequency ($f_{n2}$) of the roller bearing (7) on the side of the turbine rotor exceeds the rotational frequency ($f_{n1}$) of the roller bearing (6) on the side of the torque-recipient unit. Preferably, the rotational frequency of the respective shaft end is determined by way of Fast-Fourier Transmission and an arithmetic processor via separate measuring channels for each roller bearing (6, 7), with recourse being taken to one or more typical roller bearing frequencies emitted by these roller bearings during their rotation (FIG. 1).

21 Claims, 4 Drawing Sheets

METHOD AND APPARATUS FOR RECOGNITION OF A SHAFT RUPTURE IN A TURBO-ENGINE

This application is the national phase of international application PCT/EP99/08711 filed Nov. 12, 1999 which designated the U.S.

BACKGROUND OF THE INVENTION

This invention relates to a method for the detection of a shaft failure in a turbomachine with the purpose of initiating thereupon an appropriate speed-limiting action, more particularly a rapid fuel shut-off on an aero gas-turbine system, in which a torque-exerting turbine rotor and a torque-recipient unit are connected via the shaft which is to be monitored for failure, said shaft being essentially supported at the ends in at least two roller bearings.

In particular for aero engines, but also for industrial gas turbines for power generation, a variety of methods and devices are known which all have the objective of effectively ensuring a speed limitation if the load applied by the torque-recipient unit is lost. The objective is to avoid an uncontrolled increase in speed until self-destruction of the turbomachine, in particular of combustion turbomachines, and to prevent dangers to persons and property. Such critical operating conditions may occur if the power generator is disconnected from the electrical power-supply system in an uncontrolled manner (loss-of-load), for example in power stations with combustion turbomachines. Similarly, a failure of the shaft between the energy-generating system, i.e. the turbine rotor, and the energy-consuming system, in particular a compressor, may result in an uncontrolled increase in speed of the former. In the case of an aero engine or an aero gas-turbine system, respectively, the energy-consuming or torque-recipient system may be the fan.

In a variety of known Patent Specifications, speed-limiting devices for aero engines are described in which, upon a failure of the shaft between the energy-consuming section (e.g. the compressor) and the energy-generating section (e.g. the turbine rotor), a mechanical principle of action is applied giving way to an axial relative movement, and ultimately to the collision, of the stator and the blades of the turbine rotor. In the process of collision (also termed "tangling"), the rotational energy of the turbine rotor is dissipated by deformation, friction and destruction of the turbine rotor and stator blading concerned until standstill. For this principle of action, reference is made to the Patent Specifications U.S. Pat. No. 4,505,104, U.S. Pat. No. 4,503,667 and U.S. Pat. No. 4,498,291, for example.

In a further mechanical solution for the control of the overspeed of lower-output aero engines upon failure of the drive shaft between the low-pressure turbine and the fan, the drive shaft between the low-pressure turbine and the fan is provided with a reference shaft. In the case of a drive shaft failure, the failed drive shaft and the reference shaft will change their relative positions. A pre-loaded follower will be released and engage a wire loop. Since the low-pressure turbine continues to rotate, a pull will be exerted on the wire loop, which initiates a rapid shut-off of the fuel via a cable.

As regards an electronic solution of the overspeed problem, Patent Specification U.S. Pat. No. 4,474,013 teaches a circuitry for a steam turbine. This solution uses up to four speed sensors that operate redundantly and are associated with a gear shaft. The resultant signals of the speed sensors are proportional to the speed of the gear shaft. An appropriately designed electronic measuring-data system differentiates the speed signal and produces a derivative of acceleration. The series-connected fresh-steam valves (a stop valve and a control valve) are actuated in a pre-set overspeed situation by the acceleration values determined being processed as well as upon transgression of a speed threshold.

A further electronic solution of the overspeed problem for an aero gas-turbine system is described in Patent Specification U.S. Pat. No. 4,712,372. Two sensors are arranged on the toothed turbine shaft which produce a signal that is speed-proportional to the number of teeth of the shaft. Both sensors operate redundantly with each other, with the one channel being analog and the other channel providing digital signal processing and transmission. If an overspeed situation is detected by both sensors, a solenoid fuel valve will be actuated and the fuel supply interrupted.

Patent Specification U.S. Pat. No. 4,635,209 teaches another electronic solution for controlling overspeed situations in connection with a steam turbine. In this solution, the principle of measurement is again based on a pulsed measuring signal produced on a toothed shaft. To enhance the measured value accuracy, three independent measuring channels are used at the same measuring location. One of the three measuring channels is provided with a monitoring function. Each of the measuring channels communicates via a programmable computer.

Accordingly, the known or published systems for the control and limitation of overspeed conditions are either of the mechanical or the electromechanical/electronic type.

A commercial embarrassment to the aforesaid problem solution, therefore, lies in the plurality of the systems which, in terms of design, are to be adapted to the specific conditions of the respective aero engine. In the case of aero engines that apply the tangling principle to safely control a shaft failure between the fan and the low-pressure turbine, total loss of the blading and correspondingly high replacement costs are to be anticipated. A mechanical system using a reference shaft will, upon actuation, lose at least part of the components and, also, increase the mass of the engine, a circumstance which is apparently undesirable for aerospace applications.

Accordingly, the mass-cost relation of mechanical solutions for the implementation of the required safety shut-off function upon failure of the shaft between the fan and the low-pressure turbine is to be considered to be adverse with regard to manufacturing and operating costs. Electromechanical or electronic solutions are clearly outdistancing the mechanical solutions in terms of total costs.

The known electromechanical and electronic solutions are applied solely for the monitoring of a specified rotor speed. These systems are presently not capable of detecting shaft failures. In particular aero gas turbines in the higher performance classes and turbines of industrial power plants, for which light-weight construction is irrelevant, have a moment of inertia the magnitude of which is commensurate with the time necessary to counteract overspeed with the conventional electromechanical and electronic methods (speed measurement process and actuators) and the associated high dead times and time lags. Speed measurement processes used in these applications are based on the summation of discrete individual pulses over a measuring period. The known electromechanical and electronic solutions are considered technically inappropriate for lower-performance aero engines, since, in combustion turbomachines with very low moments of inertia, these solutions do not respond fast enough to a demand case. In the case of smaller engines, therefore, the required measuring period is too large in relation to the time that is left to detect a shaft failure, generate the required actuating signal and actuate the rapid shut-off.

Further, the known measuring devices for rotational speed and their derivatives, such as angular velocity and angular acceleration, have insufficient sensitivity and measuring resolution to produce a measuring signal in the short time necessary for the actuation of rapid shut-off and speed limitation.

BRIEF SUMMARY OF THE INVENTION

In a broad aspect, the present invention provides an accordingly improved, in particular cost-effective and safe method for the detection of a shaft failure on a turbomachine.

As a particular object of the present invention, the rotational frequencies of the two shaft ends in the respective roller bearings of the shaft to be monitored for failure are determined and compared with each other continually and essentially in real time, and a shaft failure is inferred if the rotational frequency on the roller bearing on the side of the turbine rotor exceeds the rotational frequency on the roller bearing of the torque-recipient unit.

Further objects and advantages are cited in the subclaims, in particular beneficial features of a preferred apparatus for the implementation of the method in accordance with the present invention.

The present invention preferably refers to the problem of a failure of the shaft between the fan as torque-recipient unit and the torque-exerting low-pressure turbine rotor of an aero engine or an aero gas-turbine system, respectively, and to the required limitation of the speed of the low-pressure rotor, but may be applied similarly to any turbomachinery. The object here is to provide an electromechanical/electronic embodiment of the said method and the respective apparatus.

In accordance with the present invention, the rotational frequency of each end of a shaft of a turbomachine which is essentially supported at the ends in roller bearings is determined in the respective roller bearing. If significant differences between the rotational frequencies of the two shaft ends are encountered, failure of the shaft will be inferred and, consequently, an appropriate speed-limiting action will be initiated.

While this proposal may appear relatively simple at first glance, the requirements imposed on measurement techniques and the pertinent evaluation electronics are extremely stringent to ensure the required level of safety, for example for aero engines. The entire process for the determination of the rotational frequency must accordingly be executed extremely fast, i.e. the determination of the rotational frequencies and the subsequent evaluation should be accomplished in real time to respond as rapidly as possible to a shaft failure so detected. In a preferential arrangement, therefore, a separately operating measuring channel is provided for each roller bearing to determine the rotational frequency of the respective shaft end in the roller bearing, with both measuring channels being connected to a comparator for the purpose of comparison of the rotational frequencies and with the generation of the measuring signal, its transmission and processing until comparison of both rotational frequencies being accomplished in the real-time frame. Accordingly, if a significant difference between the two rotational frequency occurs, an electric variable can then be generated in real time to initiate an appropriate speed-limiting action, for example the closure of a fuel quick-action shut-off valve.

BRIEF DESCRIPTION OF DRAWINGS

While various options exist for the determination of the rotational frequencies of the shaft ends in the roller bearings, conventional speed sensors mostly operate too slowly to enable the entire process to be executed in real time. Therefore, the rotational frequency of the respective shaft end is determined via separate measuring channels for each roller bearing by way of an arithmetic processor and a Fast-Fourier transmission, taking recourse to one or more typical roller bearing frequencies emitted by these bearings during their rotation. The merits of such a measuring technique are maximum speed and a safety level which satisfies aerospace requirements. In a preferred arrangement, the rotational frequencies of the roller bearing cage and/or the cycling frequency of the roller bearing outer ring and/or the cycling frequency of the roller bearing inner ring and/or the rolling element rotational frequency are determined in the real-time frame for both roller bearings via a filter unit, and the rotational frequencies of the shaft ends supported in the roller bearings are established therefrom.

In the following, the detailed description of a preferred embodiment of this method is preceded by an explanation of the physical laws on which the measuring principle applied is based:

Basically, it can be assumed that the power-transmitting shaft between the fan and the low-pressure turbine rotor is essentially supported in roller bearings at the two shaft ends. The rolling motions of the rolling elements in the roller bearing cage produce periodic pressure forces on their running surfaces. The deformations caused produce periodic vibrations. Imperfections (e.g. pitting) on the cycled surfaces advantageously augment the vibrations that arise.

The relationship between the bearing geometry and the typical emission frequencies for roller bearings, as shown below, were described by Sturm, A. et al. in "*Wälzlagerdiagnose an Maschinen und Anlagen*" ("Diagnosis of roller bearings on machinery and plants"), published by Verlag T ÜV Rheinland GmbH 1986 in Cologne. Reference is made to the enclosed FIGS. 2 to 4 which were taken from the above literature.

Figure 2:
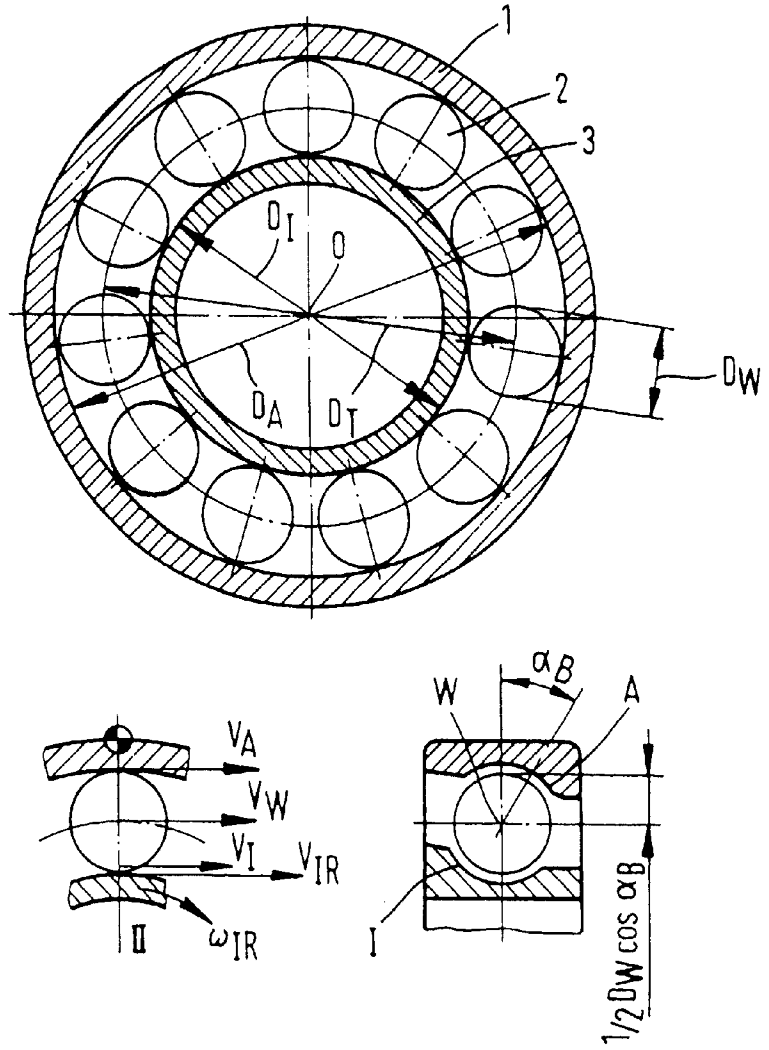
Figure 3:
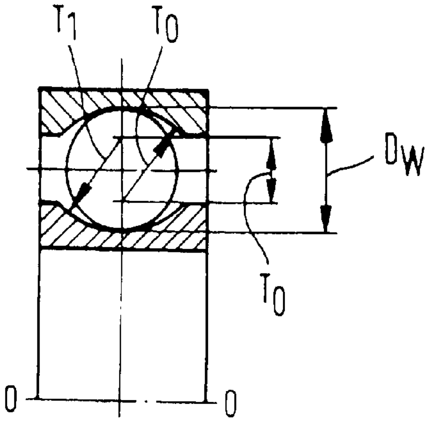
Figure 4:
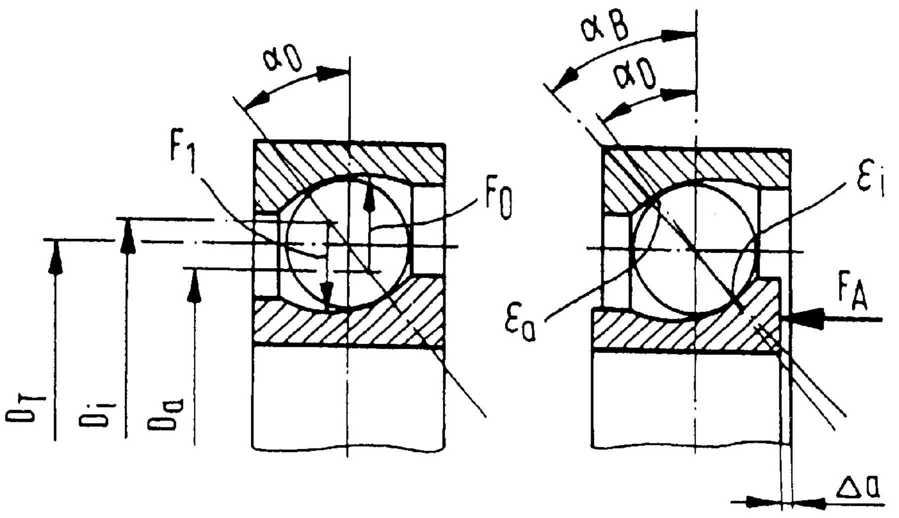

FIG. 2 illustrates the geometry and the motion relationships of an angular-contact ball bearing using the following references:

1=Outer ring, 2=Ball, 3=Inner ring $V_A$=Circumferential speed of the point of contact A $V_{K\bar{A}}$, $V_W$=Circumferential speed of the rolling element center W $V_I$=Circumferential speed of the point of contact I $V_{IR}$=Circumferential speed of the inner-ring rolling surface $\omega_{IR}$=Angular velocity of the inner ring $\alpha_B$=Pressure angle n=Speed FIG. 3 illustrates the curvature radii of a deep-groove ball bearing using the following references:

$r_a$=Curvature radius of the outer-ring rolling surface $r_i$=Curvature radius of the inner-ring rolling surface $r_o$=Distance of the curvature centers $D_W$=Diameter of the rolling element FIG. 4, finally, illustrates the determination of the nominal pressure angle L and of the operating pressure angle $\alpha_B$ for angular-contact ball bearings.

Accordingly, for roller bearings, the resultant characteristic frequencies for the ideal rolling case are as shown in the following equations (A) to (E):

(A): Rotational frequency of the cage:

$$f_{KA} = \frac{1}{2} f_n \cdot \left(1 - \frac{D_W}{D_T} \cos\alpha_B\right)$$

(B) Cycling frequency of the outer ring:

$$f_A = \frac{1}{2} f_n \cdot z \cdot \left(1 - \frac{D_W}{D_T} \cos\alpha_B\right)$$

(C) Cycling frequency of the inner ring:

$$f_I = \frac{1}{2} f_n \cdot z \cdot \left(1 + \frac{D_W}{D_T} \cos\alpha_B\right)$$

(D) Rolling element rotational frequency:

$$f_{WA} = \frac{1}{2} f_n \cdot \frac{D_T}{D_W} \cdot \left[1 - \left(\frac{D_W}{D_T} \cos\alpha_B\right)^2\right]$$

(E) Cycling frequency of a ball irregularity on both rolling surfaces:

$$f_W = 2 f_{WA} = f_n \cdot \frac{D_T}{D_W} \cdot \left[1 - \left(\frac{D_W}{D_T} \cos\alpha_B\right)^2\right]$$

In the above equations (A) to (E), the rotational frequency of the respective shaft end in the roller bearing is indicated by $f_n$, the number of rolling elements by z. Accordingly, the following relation applies for the operating pressure angle $\alpha_B$ in accordance with the FIGS. 3 and 4 of a deep-groove ball bearing subject to radial and axial loading:

$$\sin\alpha_B = \frac{\sin\alpha_o + \Delta\alpha / r_o}{\sqrt{\cos^2 \alpha_o + (\sin\alpha_o + \Delta\alpha / r_0)^2}}$$

Incidentally, roller bearings without axial load likewise satisfy the equations (A) to (E), with $\alpha_B$=90°.

Figure 5:
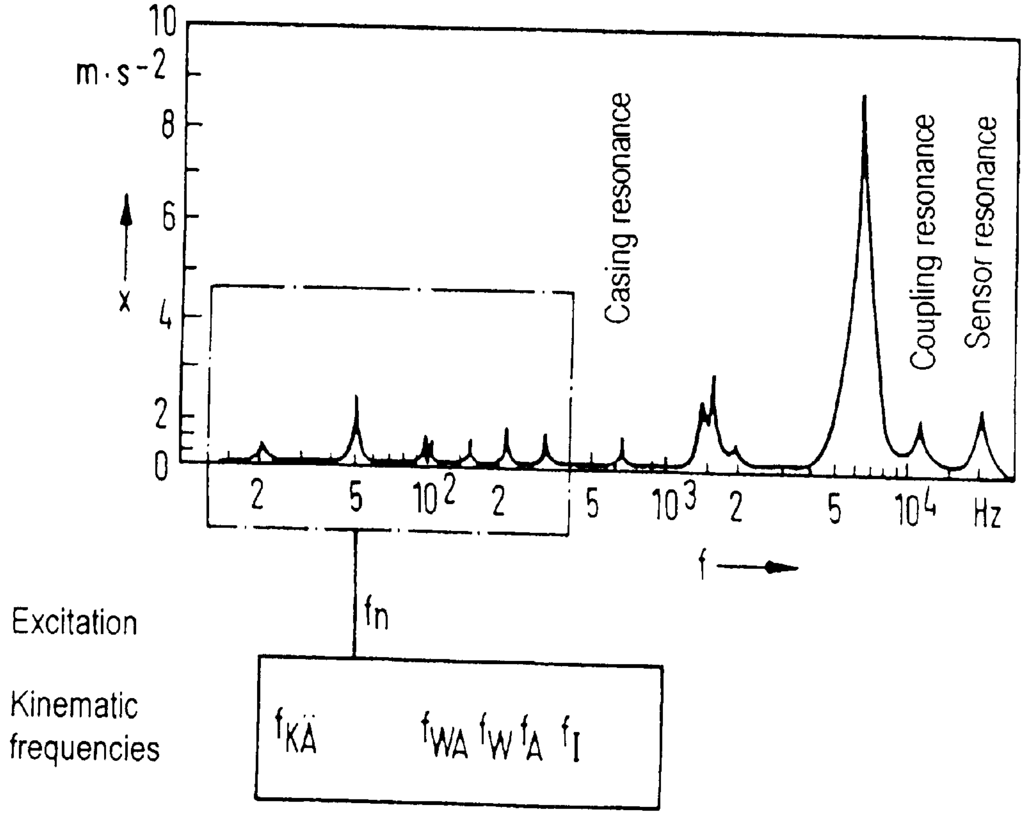

Further components of the vibration spectrum may also be caused by excitations outside the roller bearing. The sensor and the coupling resonance are mapped as permanent constant resonances. A typical vibration spectrum for a roller bearing with an acceleration pickup as measuring sensor is illustrated in FIG. 5,

DETAILED DESCRIPTION OF DRAWINGS

The present invention will be detailed below in the light of a preferred embodiment for a two-shaft aero engine or a usual two-shaft aero gas-turbine system, respectively, illustrated in highly simplified form in FIG. 6.

Figure 6:
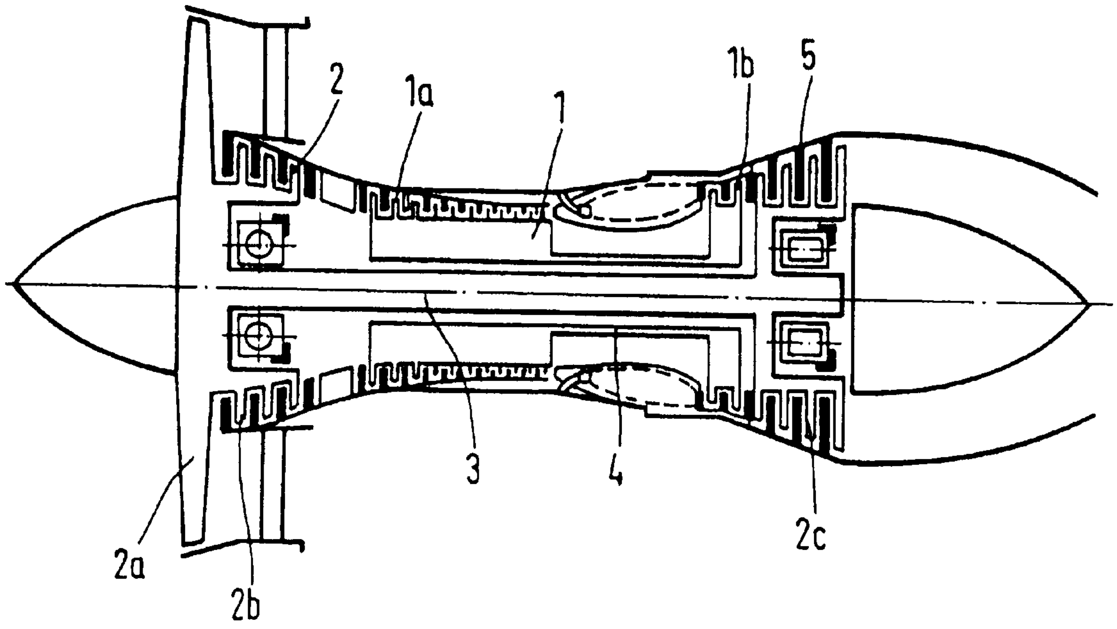

The aero engine illustrated in FIG. 6 comprises a high-pressure system 1 and a low-pressure system 2 which are provided with shafts 3 and 4 for power transmission. The two shafts 3, 4 are not mechanically connected with each other and, therefore, rotate independently of each other. The low-pressure system 2 comprises the fan 2*a*, the rotor of the booster stage 2*b* and the low-pressure turbine rotor 2*c* which are all connected via the shaft 3, The high-pressure compressor rotor 1*a* and the high-pressure turbine rotor 1*b* are connected via the shaft 4.

If an external event, such as bird strike, material fatigue or another cause, leads to a failure of the shaft 3 due to overstress—an extremely unlikely case in practice—the load will be removed from the low-pressure turbine rotor 2*c*. As a consequence, the speed of the low-pressure turbine rotor 2*c* will rapidly increase in an uncontrolled manner. In the most adverse case, the maximum permissible speed of the low-pressure turbine rotor 2*c* will be exceeded within a short period of time. Centrifugal overstress with transgression of the material strength may then possibly cause destruction by sudden explosion of the low-pressure turbine rotor 2*c*.

Figure 1:
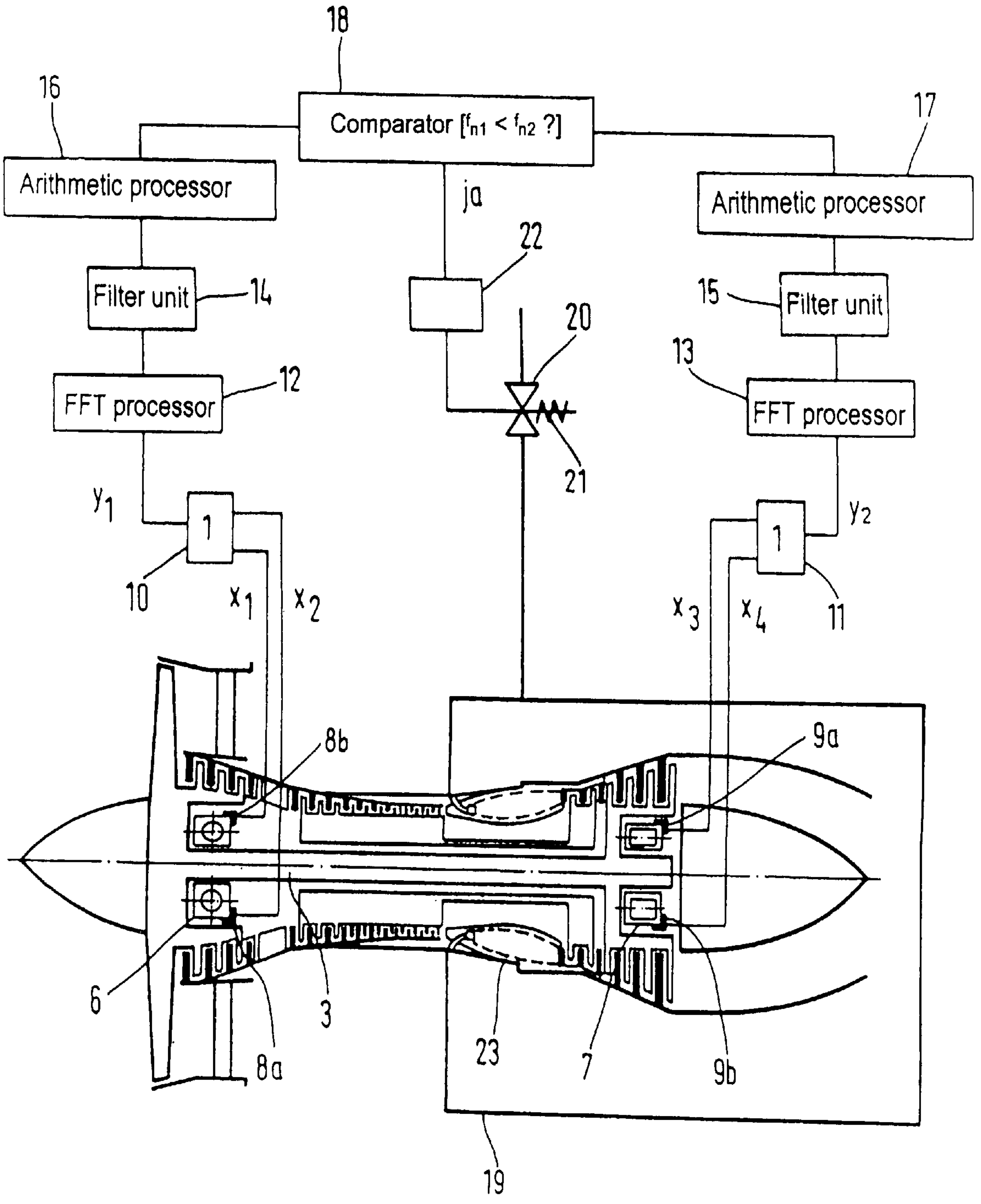

This situation can be avoided by immediate, almost undelayed, rapid shut-off of the fuel upon failure of the shaft 3, thereby interrupting the energy supply to the low-pressure turbine 2*c*. Because of the internal friction of the aero engine, the low-pressure turbine rotor 2*c* will then slow down until standstill. The method and the pertinent apparatus proposed for this purpose are illustrated in FIG. 1, this figure providing once more the aeroengine and, by way of a simplified flowchart, the method for detection of a shaft failure and, if applicable, for rapid fuel shut-off in accordance with the present invention.

As becomes apparent, the shaft 3 is supported on the side of the torque-recipient unit in the form of the fan 2*a* and the booster stage 2*b* in a roller bearing 6 of the deep-groove ball type. On the side of the torque-exerting low-pressure turbine rotor 2*c*, the shaft 3 is supported in a roller bearing 7 with cylindrical rolling elements.

Two measuring sensors 8*a* and 8*b* in the form of acceleration pickups are coupled to the fan-side roller bearing 6. Two such measuring sensors 9*a* and 9*b* in the form of acceleration pickups are further provided on the roller bearing 7 on the side of the turbine rotor. This redundancy of the acceleration pickups on the roller bearings 6, 7 serves, in particular, the operational safety. Should one of the acceleration pickups 8*a*, 8*b* or 9*a*, 9*b* fail, a measuring signal will be provided by its counterpart.

For each of the two roller bearings 6 and 7, a separate measuring channel of identical design is provided. Since only one measuring signal is required per roller bearing 6 or 7, respectively, the two measuring sensors 8*a* and 8*b* are connected to an OR gate 10. Similarly, the measuring sensors 9*a* and 9*b* are connected to an OR gate 11.

These OR gates 10 and 11 output a complex-periodic measuring signal in the time range to be allocated to the respective roller bearings 6 and 7. By way of a Fast-Fourier Transmission (termed FFT as usual), the pending signal functions {f(t)=f (t+nT), n=0; 1; 2 . . . } are then converted from the time range to the frequency range. As usual, "t" designates a point in time and "T" the period of the periodic function.

The basic equations for a Fourier-transformed complex-periodic measuring signal are dispensed with herein since they are known to the expert. It should be noted, however, that the Fourier Transformation is effected by the FFT processors 12 and 13, The Fourier-transformed measuring function is now available in the form of the frequency map. If, however, the calculation was made as discrete Fourier Transformation, the calculation effort would lie outside the real-time frame. Therefore, recursion formulas are used which reduce the computation effort by the factor $10^3$, Mature methods for this Fast-Fourier Transmission are available in a variety of versions. The FFT processors 12 and 13 fulfill this task in the real-time frame.

Subsequently, the measured value functions thus processed which were subject to a considerable data reduction without any loss of information pass the filter units 14 and 15, These filter units 14, 15 are designed such that they only let pass a frequency band between 0 Hz and the maximum frequency established from the above-specified equation (C) (in connection with the FIGS. 2 to 4) and giving the cycling frequency of the roller bearing inner ring. In this equation (C), the value $f_n$ is the maximum permissible rotational frequency of the low-pressure turbine rotor 2*c*. The said filtering is accomplished almost without delay under real-time conditions.

The pre-processed and filtered measured value result is then made available to the arithmetic processors 16 and 17. Both arithmetic processors 16 and 17 operate independently of each other and have a data processing speed which satisfies real-time requirements. Using calculation methods not further specified here, the arithmetic processors 16 and 17 provide for determination of the following values for the roller bearings 6 and 7 from the amplitude spectra available:

the rotational frequency of the bearing cage, the cycling frequency of the outer ring, the cycling frequency of the inner ring, and the rolling element rotational frequency.

From the above frequencies, the arithmetic processors 16 and 17 will separately calculate the rotational frequency $f_{n1}$ on the roller bearing 6 and the rotational frequency $f_{n2}$ on the roller bearing 7, using the equations (A) to (D) specified further above. The rotational frequency $f_{n1}$ is that of the torque-recipient unit or fan 2*a*, and the rotational frequency $f_{n2}$ is that of the low-pressure turbine rotor 2*c*.

The physics of the measuring process, therefore, provide for four pieces of frequency information which are redundant to each other and are all reducible to the excitation frequency $f_n$. Accordingly, the measured signal itself has a high safety standard in terms of redundancy and accuracy of the measuring information. Applying the normal distribution of the measuring error of statistical measuring methods, the arithmetic processors 16 and 17 will make a comparison of the rotational frequencies of the roller bearings established from the equations (A) to (D) above, with a pre-defined scatter range not to be exceeded.

Preferably, the Gaussian method of the smallest error squares is applied for determining the effective values $f_{n1}$ and $f_{n2}$ and the standard deviations $\sigma_1$ and $\sigma_2$ of the measuring results, these being subsequently used for evaluation. As becomes apparent, the rotational frequency information is available for both roller bearings 6, 7 in the form $\{f_{n1}\pm\sigma_1\}$ and $\{f_{n2}\pm\sigma_2\}$, respectively.

These two pieces of information are then supplied to a comparator 18 for evaluation which is also capable of real-time processing. In this connection, it is irrelevant whether the comparison of the two rotational frequencies $f_{n1}$, $f_{n2}$ is made by hardware or/and software. The only important factor is that the information is processed in the real-time frame. The rotational frequencies $\{f_{n1}\pm\sigma_1\}$ and $\{f_{n2}\pm\sigma_2\}$ will be considered as matching if, as a result of the comparison, the overlap of the measurement distributions is found to be within the limits described further below. The cases $\{f_{n1}+\sigma_1\}=\{f_{n2}-\sigma_2\}$ and $\{f_{n2}+\sigma_2\}=\{f_{n1}-\sigma_1\}$ are here considered as marginal cases of match.

If the rotational frequency $f_{n1}$ of the fan 2*a* and the rotational frequency $f_{n2}$ of the turbine rotor 2*c* are found to match under the above conditions, there is no need to take a suitable speed-limiting action, in particular a rapid shut-off of the fuel supplied to the combustion chamber 23 of the aero engine. If, however, the comparison comes to the result that $\{f_{n1}+\sigma_1\}$ is smaller than (<) $\{f_{n2}-\sigma_2\}$, failure of the shaft 3 can be inferred. In this case, then, a speed-limiting action will have to be taken, in particular a safety shut-off of the fuel supply via a fuel manifold 19.

For this purpose, the fuel manifold 19 is provided with a quick-action fuel shut-off valve 20. This quick-action fuel shut-off valve 20, which is provided with a solenoid actuator 22 not further specified herein, is always kept closed in the de-energized state by the action of a spring 21. Accordingly, if the rotational frequencies $f_{n1}$, $f_{n2}$ or $\{f_{n1}+\sigma_1\}$, $\{f_{n2}-\sigma_2\}$ respectively, of the two-roller bearings 6 and 7 are in match, the quick-action fuel shut-off valve 20 is energized and held open.

However, in the event that $f_{n1}<f_{n2}$ or $\{f_{n1}+\sigma_1\}<\{f_{n2-\sigma 2}\}$, respectively, the comparator 18 will generate an actuating signal which will immediately and without delay set the solenoid actuator 22 to the de-energized state. The quick-action fuel shut-off valve 20 will then immediately be closed by the pre-load of the spring 21. With the fuel supply interrupted, the combustion process in the combustion chamber 23 will be stopped. The internal friction processes will then prevent a further, uncontrolled increase of the speed of the low-pressure turbine rotor 2*c* and finally bring it to a standstill.

Accordingly, the above method provides for a reduction of the delay time of electronic/electric systems for speed limitation of turbomachinery such that they actually can be applied for such turbomachinery and, in particular, for aero gas-turbine systems with low moments of inertia. A response delay for speed limitation and safety shut-off at the level of comparable direct-operating, mechanical systems for aero engines is requisite to make use of the following advantages:

Significantly lower mass input for the components providing the function speed limitation/safety rapid shut-off upon failure of the shaft between the fan and the low-pressure turbine, Lower operating costs for aero engines on account of the saving in mass, Mass-cost relationship superior to mechanically operating speed limitation/safety rapid shut-off devices, Function ensured without unnecessary destruction of components and assemblies required to produce the forces for running down and for dissipation of the excessive rotational energy, Implementation cost-effectiveness superior to existing mechanical solutions, Application of the commonality concept for manufacturers of engine families, No aerodynamic compromises to be made as to the turbine blading under the aspect of safety, Lower operating costs due to improved specific fuel consumption resulting from optimal aerodynamic design of the low-pressure turbine blading, The method here described, or an apparatus operating to this method, is retrofittable.

Reliability at a level comparable with direct-operating systems is ensured by the redundancy of the measuring points, the measuring signal information and its processing. It is apparent that a plurality of modifications may be incorporated in the present embodiment without departing from the inventive. concept expressed in the Claims.

What is claimed is:

1. Method associated with the detection of a shaft failure in a turbomachine, in which a torque-exerting turbine rotor and a torque-recipient unit are connected via a shaft to be monitored for failure, wherein the shaft is supported essentially at the ends in at least two roller bearings, the method comprising:

determining rotational frequencies of the two shaft ends in the roller bearings by sensing and analyzing a vibration spectrum of each roller bearing, and comparing the rotational frequencies continually and essentially in real time; and inferring a failure of the shaft if the rotational frequency of the shaft end in the roller bearing on a side of a turbine rotor exceeds the rotational frequency of the shaft end in the roller bearing on the side of the torque-recipient unit by a predetermined amount.

2. Method of claim 1, further comprising:

providing one separately operating measuring channel for each shaft end in the corresponding roller bearing associated with the determination of the rotational frequencies of the corresponding shaft end in the roller bearings; and connecting the two measuring channels to a comparator associated with the comparison of the rotational frequencies, with the measuring signal generation, transmission and processing until comparison of the two rotational frequencies being performed in the real time frame and with an electric variable being formed in real time which, in the case of a significant difference between the two rotational frequencies, will immediately initiate a speed-limiting action.

3. Method of claim 1, wherein the measuring signal gained from the roller bearings via measuring sensors provides for redundancy of the measuring information.

4. Method of claim 1, in which the method comprises transforming a complex-periodic measuring signal $\{f(t)=f(t+nT)$, with $n=0; 1; 2 \ldots\}$ from a time range to a frequency range in the real-time frame via way of Fast-Fourier Transmission, with an amplitude spectrum made available.

5. Method of claim 1, wherein a rotational frequency of a roller bearing cage and a cycling frequency of a roller bearing outer ring and a cycling frequency of a roller bearing inner ring and a rolling element rotational frequency is determined for both roller bearings in the real-time, and in which the rotational frequencies of the shaft ends supported in the roller bearings is established therefrom.

6. Method of claim 1, wherein the rotational frequency of the corresponding shaft end is established for both roller bearings via means of an arithmetic processor via separate measuring channels, taking recourse to at least one typical roller bearing frequency emitted via the roller bearings during their rotation.

7. Method of claim 1, wherein the rotational frequencies are established in the form $\{f_{n1}\pm\sigma_1\}$ and $\{f_{n2}\pm\sigma_2\}$ in accordance with a Gaussian method of a smallest error squares when more than one typical roller bearing frequency is applied.

8. Method of claim 1, further comprising rapidly closing a quick-action fuel shut-off valve open by energization to supply fuel to the turbomachine by immediately de-energizing the valve if a significant difference between the two rotational frequencies occurs in the possible rotational speed range of the two roller bearings.

9. Method of claim 8, wherein the quick-action fuel shut-off valve is energized and open in the possible rotational speed range from $\{f_{n2}+\sigma_2=f_{n1}-\sigma_1\}$ to $\{f_{n1}+\sigma_1=f_{n2}-\sigma_2\}$ of the two roller bearings and the rapid closure of the quick-action fuel shut-off valve is effected if the condition $\{f_{n1}+\sigma_1<f_{n2}-\sigma_2\}$ is satisfied.

10. Method of claim 1, wherein at least one of a rotational frequency of a roller bearing cage and a cycling frequency of a roller bearing outer ring and a cycling frequency of a roller bearing inner ring and a rolling element rotational frequency is determined for both roller bearings in the real-time, and in which the rotational frequencies of the shaft ends supported in the roller bearings is established therefrom.

11. Method of claim 1, wherein at least two of a rotational frequency of a roller bearing cage and a cycling frequency of a roller bearing outer ring a cycling frequency of a roller bearing inner ring and a rolling element rotational frequency is determined for both roller bearings in the real-time, and in which the rotational frequencies of the shaft ends supported in the roller bearings is established therefrom.

12. Method of claim 1, wherein at least three of a rotational frequency of a roller bearing cage and a cycling frequency of a roller bearing outer ring and a cycling frequency of a roller bearing inner ring and a rolling element rotational frequency is determined for both roller bearings in the real-time, and in which the rotational frequencies of the shaft ends supported in the roller bearings is established therefrom.

13. Method of claim 1, wherein a rotational frequency of a roller bearing cage and a cycling frequency of a roller bearing outer ring is determined for both roller bearings in the real-time, and in which the rotational frequencies of the shaft ends supported in the roller bearings is established therefrom.

14. Method of claim 1, wherein a cycling frequency of a roller bearing outer ring and a cycling frequency of a roller bearing inner ring is determined for both roller bearings in the real-time, and in which the rotational frequencies of the shaft ends supported in the roller bearings is established therefrom.

15. Method of claim 1, wherein a rotational frequency of a roller bearing cage and a rolling element rotational frequency is determined for both roller bearings in the real-time, and in which the rotational frequencies of the shaft ends supported in the roller bearings is established therefrom.

16. Method of claim 3, wherein the measuring signal gained from the roller bearings by the measuring sensors provides for redundancy of the measuring information and is a complex-periodic signal.

17. Method of claim 2, wherein the significant difference between the two rotational frequencies will immediately initiate the speed-limiting action, which will immediately close a quick-action fuel shut off valve.

18. Apparatus associated with an implementation of a method of detection of a shaft failure in a turbomachine, comprising:

a torque-exerting turbine rotor;

a torque-recipient unit connected to the torque-exerting turbine rotor via a shaft, wherein the shaft has a roller bearing supporting each end;

at least one signal sensor associated with each of the roller bearings, each signal sensor constructed and arranged to sense a vibration spectrum of each roller bearing and emit a signal corresponding to the sensed vibration spectrum;

two arithmetic processors, each constructed and arranged to receive the signal from one of the sensors, therefrom calculate a rotational frequency of a respective shaft end and emit a signal corresponding to the rotational frequency of the respective shaft end; and a comparator constructed and arranged to receive each of the signals from the two arithmetic processors, compare the signals in real time and emit a signal to trigger a speed-limiting apparatus if the comparator determines the rotational frequency of one of the shaft ends exceeds the rotational frequency of the other of the shaft ends by a predetermined amount.

19. The apparatus of claim 18, wherein the torque-recipient unit is at least one of a compressor, a fan, a booster, a propeller and a combination thereof.

20. The apparatus of claim 18, wherein the speed-limiting apparatus comprises a quick-action fuel shut-off valve positioned in a line for supplying fuel to a combustion chamber that drives the turbine rotor, the fuel shut-off valve being spring-loaded and held in an open state via energization of a solenoid actuator, the signal to trigger the speed-limiting apparatus acting to de-energize and close the fuel-shut-off valve.

21. The apparatus of claim 18, comprising a Fast Fourier Transmission processor and a filter positioned between the sensors associated with a single one of the roller bearings and the respective arithmetic processor, the Fast Fourier Transmission processor constructed and arranged to receive the signal from the sensors, convert the signal from a time range to a frequency range by a Fast Fourier Transmission and emit a signal to the filter, the filter constructed and arranged to filter undesired bearing component frequencies from the signal and emit a filtered signal to the arithmetic processor as the signal from one of the redundant sensors.

* * * * *